July 18, 1972   T. E. HOLT ET AL   3,677,850
METHOD OF PRODUCING FIBROUS PRODUCTS
Filed June 25, 1969
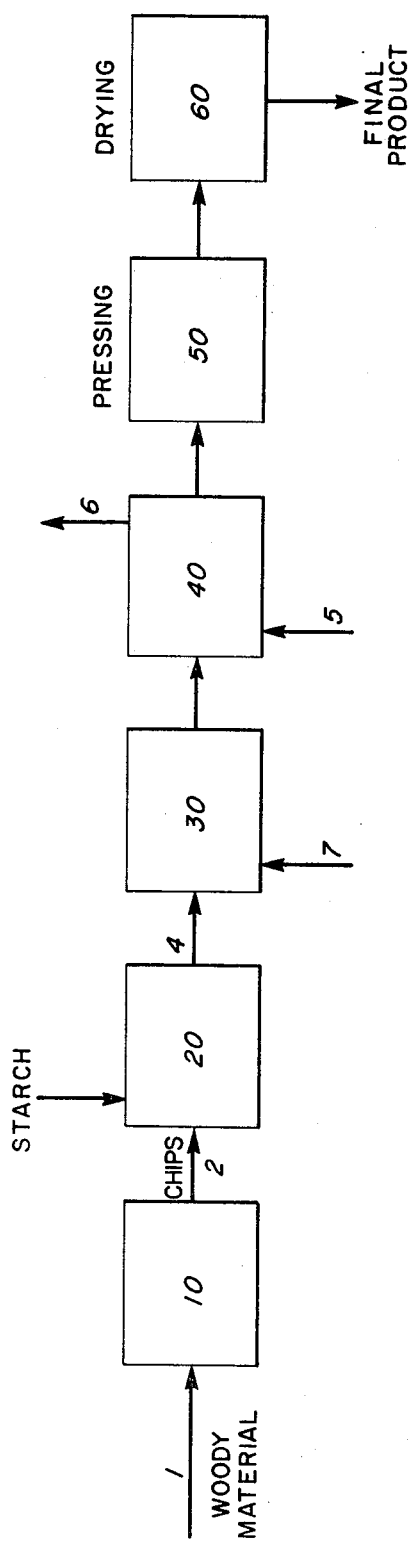
Thomas E. Holt
Edward B. Taylor   Inventors
By   W. O. T. Heilman   Attorney United States Patent Office 3,677,850
Patented July 18, 1972

3,677,850
METHOD OF PRODUCING FIBROUS PRODUCTS
Thomas E. Holt, Hudson, Quebec, and Edward B. Taylor, Montreal, Quebec, Canada, assignors to Esso Research and Engineering Company, Linden, N.J.
Filed June 25, 1969, Ser. No. 836,258
Int. Cl. B29j 5/02
U.S. Cl. 156—62.2   5 Claims

ABSTRACT OF THE DISCLOSURE

In the method of manufacturing woodfiber board products, starch binder is cooked and dispersed over the woodfiber surfaces coincidental with the preparation of the woodfibers.

DESCRIPTION OF THE INVENTION

The present invention is broadly concerned with a unique method for the manufacture of woodfiber board products in which starch is cooked and dispersed concurrently with the preparation of the woodfibers. In accordance with the present process, a source of woodfibers, such as wood chips, shavings, sawdust or other like suitable material, and starch are processed in a plurality of stages one of which comprises a pressurized refiner in the presence of steam. The resultant starch coated fiber is air felted, pressed to the required thickness or density and dried. Presently known processes require the separate refining of the wood source to give woodfibers and the separate cooking of the starch in water followed by the dispersion of the cooked starch over the surface of the wood fibers. By the present technique, the wood source is defiberized and treated with cooked starch in a single operation. Coincidentally with the defiberization the starch is cooked to solubilize it and the viscous starch solution is spread over the fiber surfaces when it functions as an adhesive binding agent on drying. Thus a high quality and strong building, packaging or insulating board is produced.

It is well known in the art to manufacture wallboard, cardboard, paper, and the like by the use of various substances which are added to the pulp. These substances improve one or more qualities of the final product such as to give it water resistance or to improve its strength and elasticity. Suitable substances are, for example, various paraffin waxes, and starches. The present invention is sepcifically concerned with a novel process for the manufacture of high quality and strong structural elements, such as building boards, insulating panels, wallboards and packaging materials.

The present invention may be more readily understood by reference to the diagrammatical drawing illustrating the various integrated and related stages. Referring specifically to the drawing, raw wood material is introduced into a chipping zone 10 by means of line 1. In chipping zone 10 the wood is chipped to the desired chip sizes. The size of the chips may vary appreciably; for example, the chips may be of a size which may pass through a ¼ inch mesh screen or a two-inch mesh screen. However, it is preferred that the size of the chips is such that the chips pass through about a one-inch mesh screen. Alternatively, wood waste such as shavings and sawdust may be used and processed as described in the present invention. The chips or other feed materials are passed to a mixing zone 20 by means of line 2. Raw starch is introduced into mixing zone 20 by means of line 3. Any suitable mixing means may be employed. The mixture is then passed by means of line 4 into a defiberization zone and starch treating zone 30 which is maintained at an elevated pressure in the range from about 25 to 200 p.s.i.g. The preferred pressure is in the range from about 25 to 75 p.s.i.g., for example, about 50 p.s.i.g.

The temperatures maintained in processing zone 30 are in the range from about 130° C. to about 200° C., preferably about 150° C. In zone 30 the fibers are defiberized and simultaneously the fibers are coated with cooked starch. The required amount of steam is introduced by means of line 7.

The amount of starch added may vary widely as, for example, in the range from about 0.5% to 10% based upon the dry weight of the woodfibers. It is preferred to add from about 1% to by weight of starch as, for example, .5% starch based upon the dry weight of the woodfibers.

The damp starch coated fibers produced during the defiberization stage 30 are formed into a fleece in stage or operation 40 by dispersing in an airstream and airfelting in the well known manner. The required air is introduced by means of line 5 and withdrawn by means of line 6. The so formed fleece is pressed in stage or operation 50 to the required thickness and density using pressures in the range of 50 to 1,500 p.s.i.g., for example, 300 p.s.i.g. dependent on the particular product being made. The pressed fleece is then dried in stage or operation 60 by any of the well known means. These may include drying at elevated temperature during the actual pressing. For example, buildingboard is often dried in a hot air stream in an oven such as a Coe dryer, or dried by more sophisticated methods such as infra red heating, radio frequency or microwave methods.

Thus, the present invention is concerned with a novel means of cooking and dispersing starch over woodfiber surfaces coincidental with the preparation of the woodfibers and without separately having to precook and mix in the starch thus obviating two separate process steps.

What is claimed is:

1. Process for the production of a woodfiber structural element which comprises mixing a woodfiber source with starch and subjecting the mixture in a processing zone to a pressure in the range from about 25 to 200 p.s.i.g. and to a steam temperature in the range from about 120° C. to about 200° C. whereby said woodfiber source is defiberized and simultaneously coated with cooked starch.

2. Process as defined by claim 1 wherein said pressure is about 50 p.s.i.g. and wherein said temperature is about 150° C.

3. Process as defined by claim 1 wherein said mixture is formed into a fleece by dispersing in an air stream.

4. Process as defined by claim 3 wherein said fleece is pressed to the desired density and thickness, using pressures in the range from about 50 p.s.i.g. to about 1500 p.s.i.g.

5. Process as defined by claim 4 wherein said pressed fleece is dried by suitable means.

References Cited

UNITED STATES PATENTS

| 2,824,037 | 2/1958 | King | 156—336 |
| 3,021,244 | 2/1962 | Meiler | 156—62.2 |

FOREIGN PATENTS

| 956,635 | 4/1964 | Great Britain | 156—622 |

BENJAMIN A. BORCHELT, Primary Examiner

H. J. TUDOR, Assistant Examiner

U.S. Cl. X.R.

156—328